US012664270B2

(12) United States Patent
Sathyanarayana et al.

(10) Patent No.: US 12,664,270 B2
(45) Date of Patent: Jun. 23, 2026

(54) CONNECTED ASSET RISK MANAGEMENT

(71) Applicant: International Business Machines Corporation, Armonk, NY (US)

(72) Inventors: Ragineni Sathyanarayana, Anantapur (IN); Raghuraman Seshadri, Bangalore (IN); Mahesh Shivram Paradkar, Pune (IN); Harsh Kulkarni, Aurangabad (IN); Ishwari Jadhav, Kolhapur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 18/611,242

(22) Filed: Mar. 20, 2024

(65) Prior Publication Data

US 2025/0298891 A1 Sep. 25, 2025

(51) Int. Cl.
| | |
|---|---|
| *G06F 21/55* | (2013.01) |
| *G06F 21/57* | (2013.01) |
| *G06Q 20/14* | (2012.01) |
| *G06Q 30/04* | (2012.01) |

(52) U.S. Cl.
CPC .......... G06F 21/554 (2013.01); G06F 21/577 (2013.01); G06Q 20/145 (2013.01); G06Q 30/04 (2013.01)

(58) Field of Classification Search
None
See application file for complete search history.

(56) References Cited

U.S. PATENT DOCUMENTS

| | | | |
|---|---|---|---|
| 9,825,981 B2 * | 11/2017 | Roytman | .............. G06F 21/577 |
| 11,522,899 B2 | 12/2022 | Somasundaram et al. | |
| 2006/0265751 A1 * | 11/2006 | Cosquer | .............. H04L 63/1416 |
| | | | 726/25 |

(Continued)

FOREIGN PATENT DOCUMENTS

CN 110851839 B 3/2022

OTHER PUBLICATIONS

Matt Wilson, 'Organization-specific risk with CWSS and CWRAF', Gitlab, 2020 (Year: 2020).*

(Continued)

*Primary Examiner* — Catherine Thiaw
*Assistant Examiner* — Amir Mahdi Hajiabbasi
(74) *Attorney, Agent, or Firm* — L. Jeffrey Kelly

(57) ABSTRACT

An embodiment extracts, from vulnerability data describing a vulnerability applicable to a connected asset within a network of connected assets, a set of technical impacts of the vulnerability. An embodiment generates, using a business value context of the connected asset and the set of technical impacts of the vulnerability, a network layer impact score corresponding to the connected asset and the vulnerability. An embodiment generates, using the business value context of the connected asset and the set of technical impacts of the vulnerability, an enterprise layer impact score corresponding to the connected asset and the vulnerability. An embodiment generates, using the network layer impact score and the enterprise layer impact score, a remediation plan for the connected asset, the remediation plan comprising a planned adjustment of the connected asset to ameliorate the vulnerability.

14 Claims, 7 Drawing Sheets

| ASSET ID | TECHNICAL IMPACTS | AVG. NL IMPACT SCORE | AVG. EL IMPACT SCORE | EXPLOITABILITY SCORE | NORMALIZED NIV | NORMALIZED EIV |
|---|---|---|---|---|---|---|
| ASSET 311 | BYPASS PROTECTION MECHANISM READ APPLICATION DATA GAIN PRIVILEGES OR ASSUME IDENTIFY EXECUTE UNAUTHORIZED CODE/COMMANDS OTHER | 1.4 | 1.4 | 2.0 | 0.84 | 0.84 |
| ASSET 311 | BYPASS PROTECTION MECHANISM READ APPLICATION DATA GAIN PRIVILEGES OR ASSUME IDENTIFY EXECUTE UNAUTHORIZED CODE/COMMANDS | 2.3 | 2.3 | 2.0 | | |
| ASSET 312 | READ APPLICATION DATA MODIFY APPLICATION DATA | 0.0 | 0.0 | 1.0 | 0.0 | 0.0 |
| ASSET 313 | BYPASS PROTECTION MECHANISM READ APPLICATION DATA MODIFY APPLICATION DATA | 3.5 | 3.5 | 3.9 | 0.82 | 0.82 |
| ASSET 313 | READ APPLICATION DATA | 0.0 | 0.0 | 0 | | |
| ASSET 313 | GAIN PRIVILEGES OR ASSUME IDENTIFY EXECUTE UNAUTHORIZED CODE/COMMANDS READ APPLICATION DATA DOS | 0.0 | 0.0 | 0 | | |

BUSINESS VALUE CONCEPT 320 E-COMMERCE — NIST CVE DATASET — EXPLOITABILITY DATA 430

TOPOLOGY 310 — IMPACT DATA 440 — NL IMPACT DATA 520 — EL IMPACT DATA 530 — COMPUTATION 540 — COMPUTATION 550

(56) References Cited

U.S. PATENT DOCUMENTS

| | | | | |
|---|---|---|---|---|
| 2009/0099885 A1* | 4/2009 | Sung | | G06Q 10/06 |
| | | | | 726/25 |
| 2011/0138471 A1* | 6/2011 | Van De Weyer | ... | H04L 63/1433 |
| | | | | 726/25 |
| 2017/0213037 A1* | 7/2017 | Toledano | | H04L 63/06 |
| 2018/0020018 A1* | 1/2018 | Walheim | | G06F 21/577 |
| 2018/0285797 A1 | 10/2018 | Hu et al. | | |
| 2020/0162497 A1* | 5/2020 | Iyer | | H04L 63/164 |
| 2020/0167705 A1* | 5/2020 | Risoldi | | G06F 21/554 |
| 2021/0286880 A1* | 9/2021 | Riley | | G06F 21/54 |
| 2022/0366052 A1* | 11/2022 | Wolfrath | | G06F 21/602 |
| 2023/0042671 A1* | 2/2023 | Zaman | | H04L 41/22 |
| 2023/0336579 A1* | 10/2023 | Ellsworth | | H04L 63/1433 |
| 2023/0370486 A1* | 11/2023 | Paquette | | H04L 63/1433 |
| 2024/0070288 A1* | 2/2024 | Koteshwara | | G06F 21/54 |
| 2024/0154991 A1* | 5/2024 | Sheridan | | H04L 63/1433 |

OTHER PUBLICATIONS

Prajanti et al., A Proposed Framework for Ranking Critical Information Assets in Information Security Risk Assessment Using the OCTAVE Allegro Method with Decision Support System Methods, Jun. 23-26, 2019.
Common Weakness Enumeration, Enumeration of Technical Impacts, 2024, https://cwe.mitre.org/cwraf/enum_of_ti.html.
Common Weakness Enumeration, CWRAF—Vignette Summary, Apr. 3, 2013, https://cwe.mitre.org/cwraf/data/vignettes.html.
Common Weakness Enumeration, Creating Your Own Vignettes, 2024, https://cwe.mitre.org/cwraf/creatingyourownvignettes.html.
NVD, NVD Web Services Endpoint, 2024, https://services.nvd.nist.gov/rest/json/cves/2.0?cveId=CVE-2022-0542.

* cited by examiner

*Fig. 3*

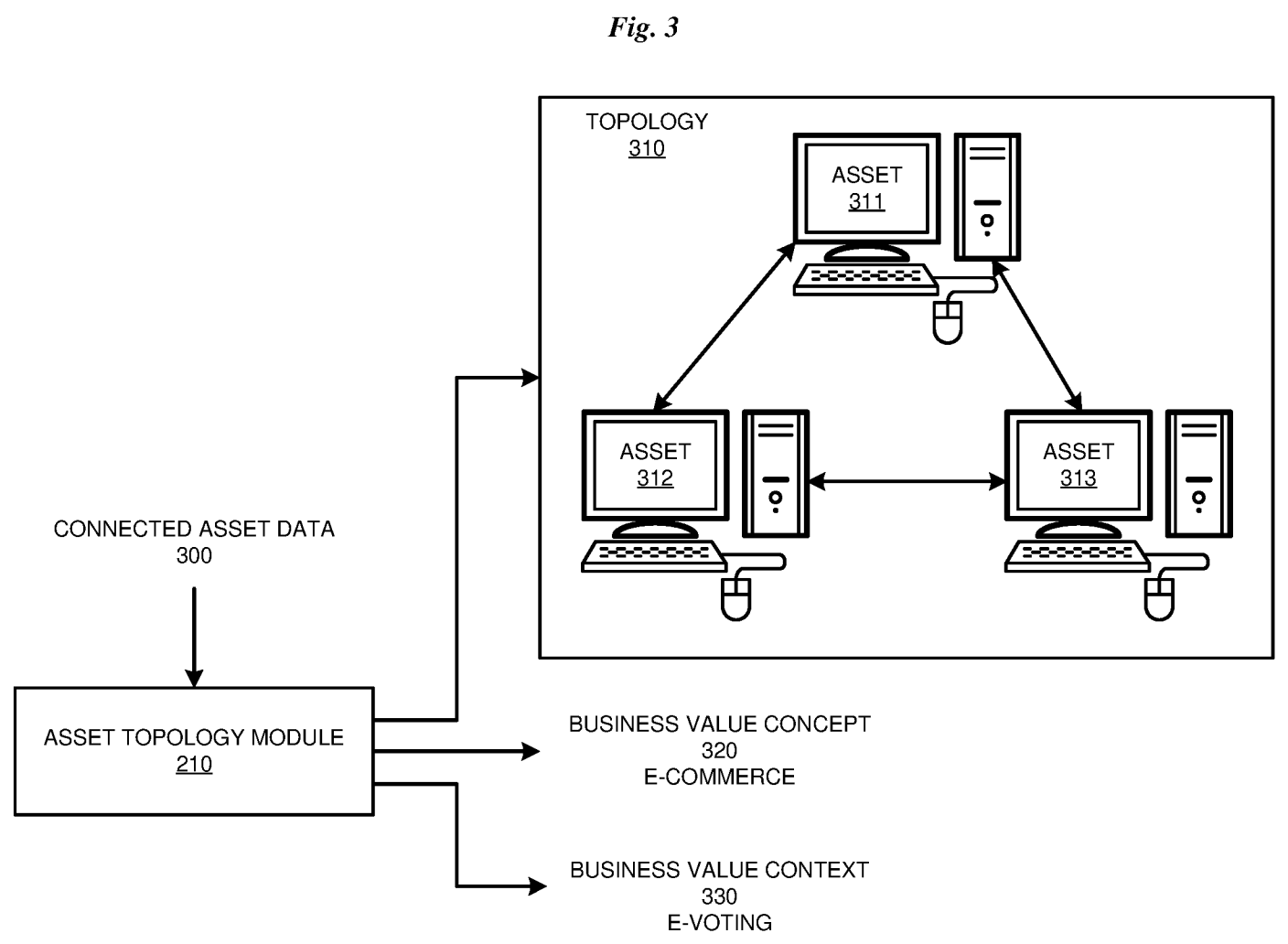

TOPOLOGY
310

ASSET
311

ASSET
312

ASSET
313

CONNECTED ASSET DATA
300

ASSET TOPOLOGY MODULE
210

BUSINESS VALUE CONCEPT
320
E-COMMERCE

BUSINESS VALUE CONTEXT
330
E-VOTING

*Fig. 4*

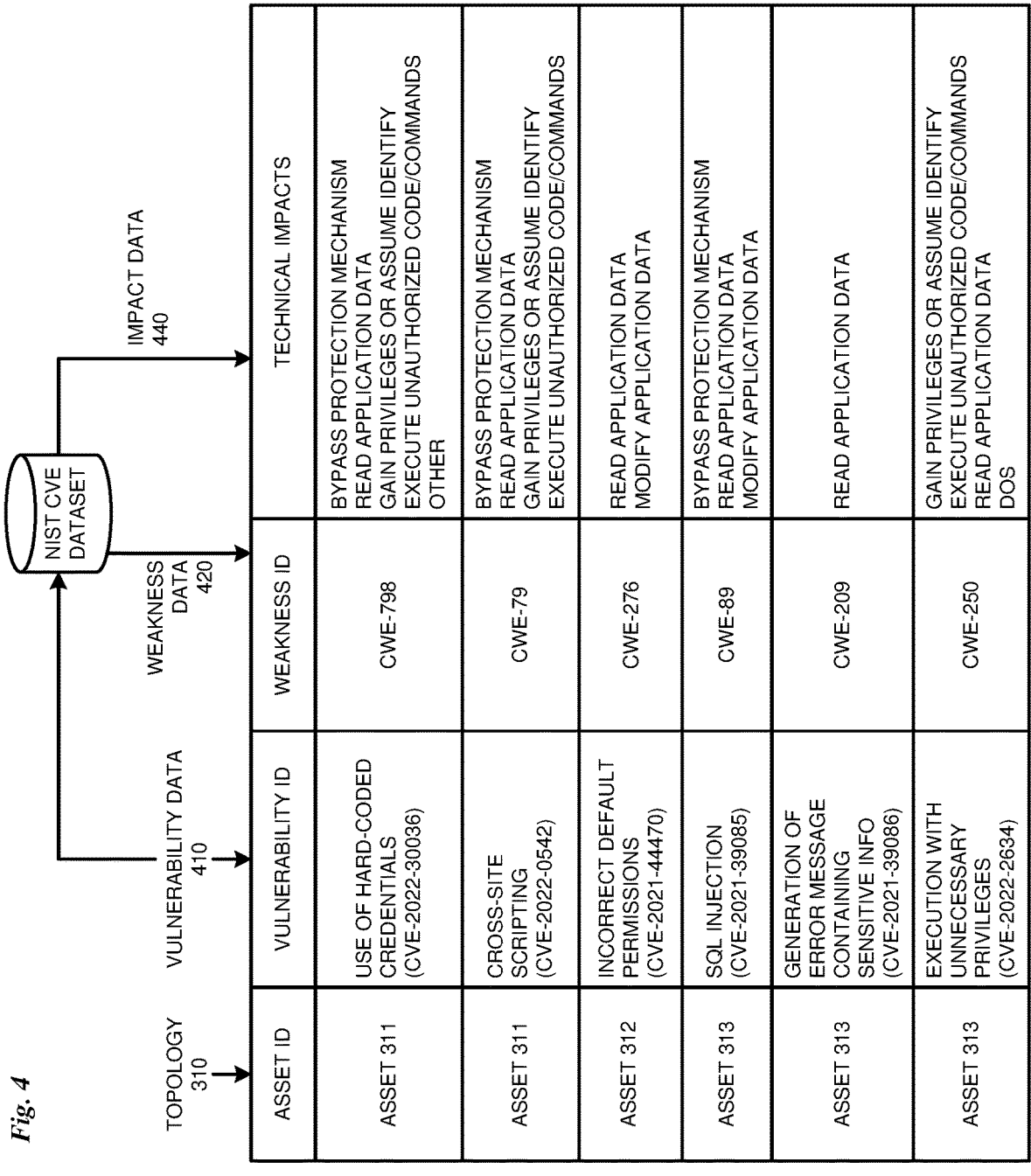

TOPOLOGY 310

VULNERABILITY DATA 410

WEAKNESS DATA 420

IMPACT DATA 440

NIST CVE DATASET

| ASSET ID | VULNERABILITY ID | WEAKNESS ID | TECHNICAL IMPACTS |
|---|---|---|---|
| ASSET 311 | USE OF HARD-CODED CREDENTIALS (CVE-2022-30036) | CWE-798 | BYPASS PROTECTION MECHANISM<br>READ APPLICATION DATA<br>GAIN PRIVILEGES OR ASSUME IDENTIFY<br>EXECUTE UNAUTHORIZED CODE/COMMANDS<br>OTHER |
| ASSET 311 | CROSS-SITE SCRIPTING (CVE-2022-0542) | CWE-79 | BYPASS PROTECTION MECHANISM<br>READ APPLICATION DATA<br>GAIN PRIVILEGES OR ASSUME IDENTIFY<br>EXECUTE UNAUTHORIZED CODE/COMMANDS |
| ASSET 312 | INCORRECT DEFAULT PERMISSIONS (CVE-2021-44470) | CWE-276 | READ APPLICATION DATA<br>MODIFY APPLICATION DATA |
| ASSET 313 | SQL INJECTION (CVE-2021-39085) | CWE-89 | BYPASS PROTECTION MECHANISM<br>READ APPLICATION DATA<br>MODIFY APPLICATION DATA |
| ASSET 313 | GENERATION OF ERROR MESSAGE CONTAINING SENSITIVE INFO (CVE-2021-39086) | CWE-209 | READ APPLICATION DATA |
| ASSET 313 | EXECUTION WITH UNNECESSARY PRIVILEGES (CVE-2022-2634) | CWE-250 | GAIN PRIVILEGES OR ASSUME IDENTIFY<br>EXECUTE UNAUTHORIZED CODE/COMMANDS<br>READ APPLICATION DATA<br>DOS |

*Fig. 5*

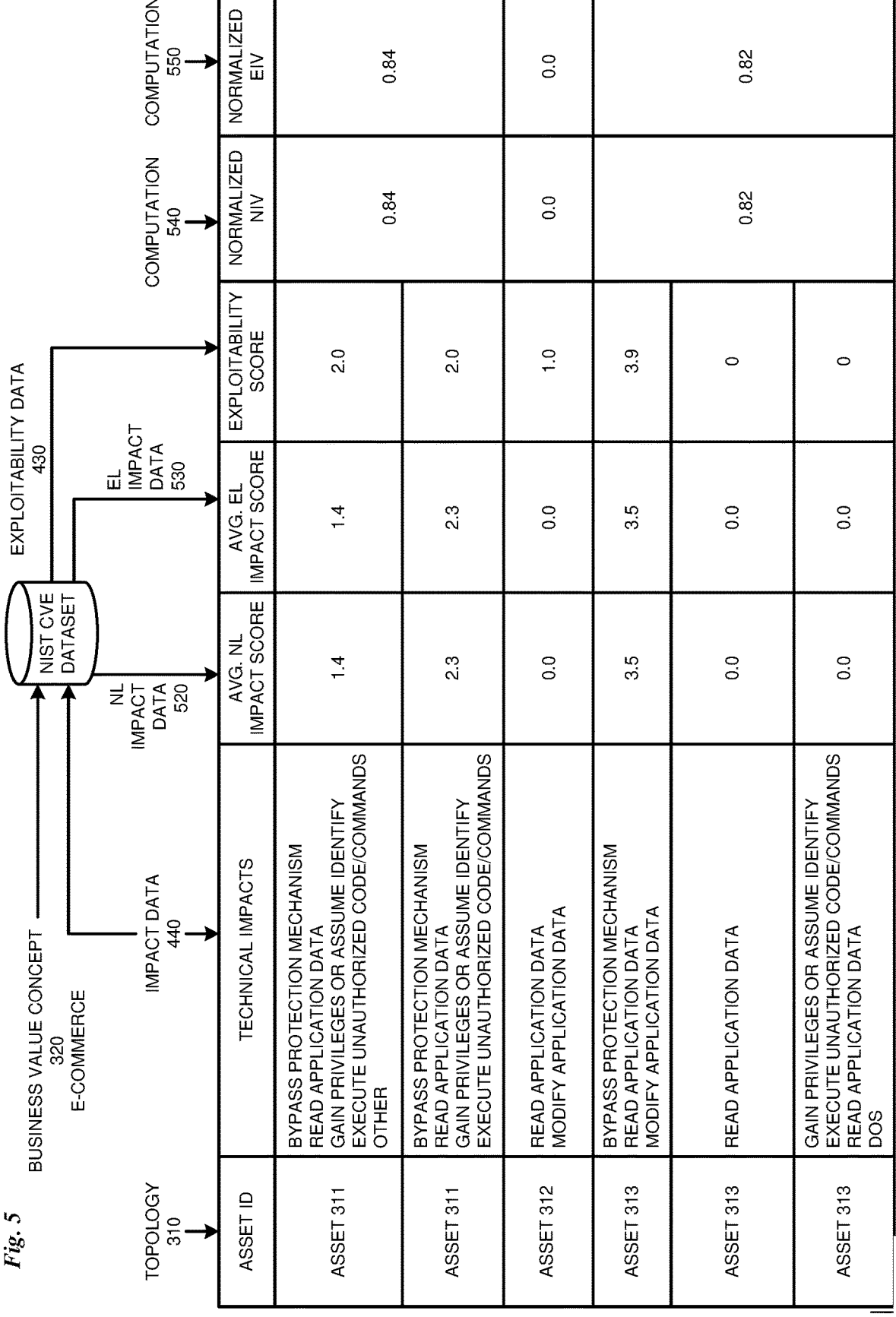

| ASSET ID | TECHNICAL IMPACTS | AVG. NL IMPACT SCORE | AVG. EL IMPACT SCORE | EXPLOITABILITY SCORE | NORMALIZED NIV | NORMALIZED EIV |
|---|---|---|---|---|---|---|
| ASSET 311 | BYPASS PROTECTION MECHANISM READ APPLICATION DATA GAIN PRIVILEGES OR ASSUME IDENTIFY EXECUTE UNAUTHORIZED CODE/COMMANDS OTHER | 1.4 | 1.4 | 2.0 | 0.84 | 0.84 |
| ASSET 311 | BYPASS PROTECTION MECHANISM READ APPLICATION DATA GAIN PRIVILEGES OR ASSUME IDENTIFY EXECUTE UNAUTHORIZED CODE/COMMANDS | 2.3 | 2.3 | 2.0 | | |
| ASSET 312 | READ APPLICATION DATA MODIFY APPLICATION DATA | 0.0 | 0.0 | 1.0 | 0.0 | 0.0 |
| ASSET 313 | BYPASS PROTECTION MECHANISM READ APPLICATION DATA MODIFY APPLICATION DATA | 3.5 | 3.5 | 3.9 | 0.82 | 0.82 |
| ASSET 313 | READ APPLICATION DATA | 0.0 | 0.0 | 0 | | |
| ASSET 313 | GAIN PRIVILEGES OR ASSUME IDENTIFY EXECUTE UNAUTHORIZED CODE/COMMANDS READ APPLICATION DATA DOS | 0.0 | 0.0 | 0 | | |

TOPOLOGY 310

BUSINESS VALUE CONCEPT 320 E-COMMERCE

IMPACT DATA 440

EXPLOITABILITY DATA 430

NIST CVE DATASET

NL IMPACT DATA 520

EL IMPACT DATA 530

COMPUTATION 540

COMPUTATION 550

*Fig. 6*

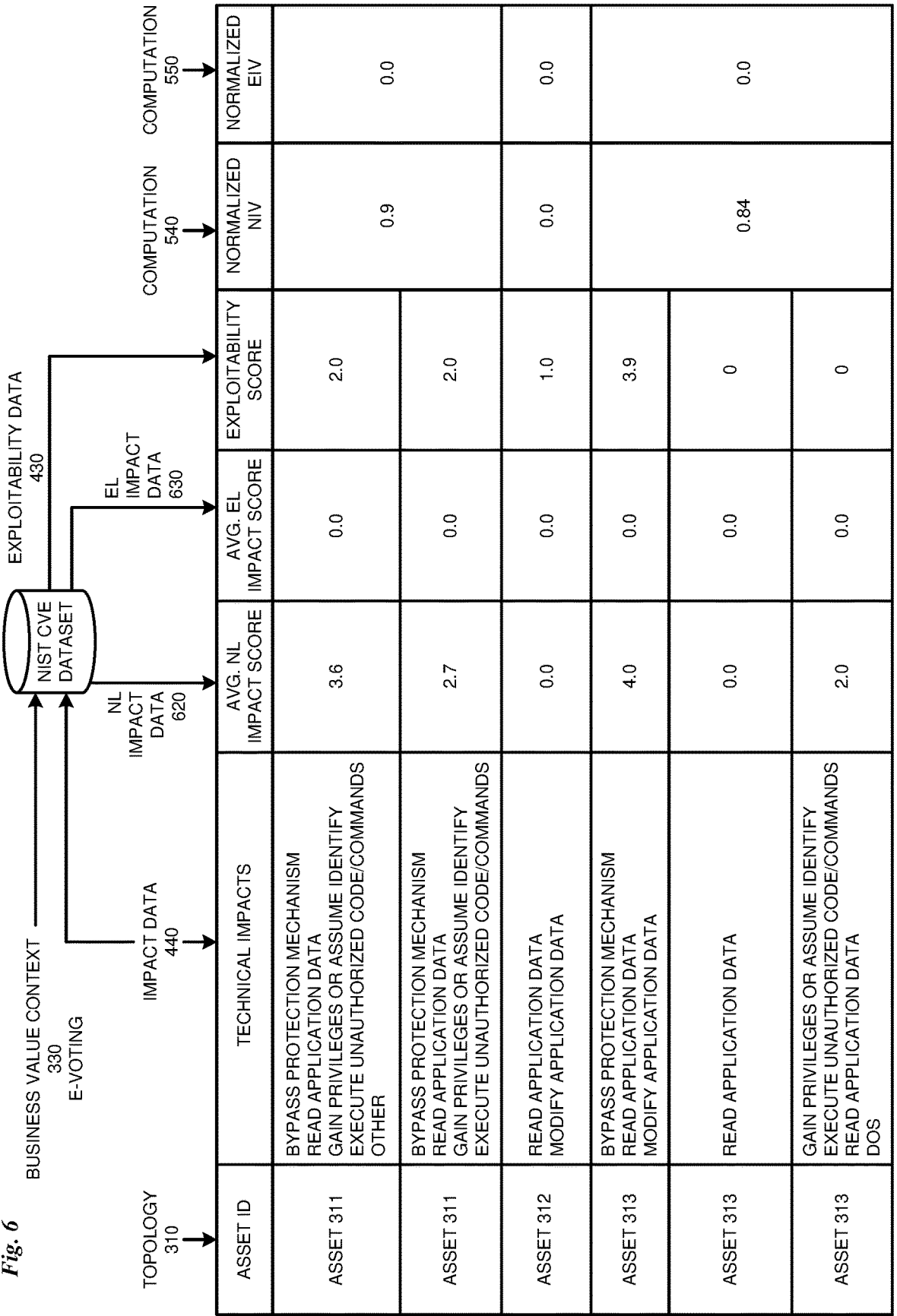

| ASSET ID | TECHNICAL IMPACTS | AVG. NL IMPACT SCORE | AVG. EL IMPACT SCORE | EXPLOITABILITY SCORE | NORMALIZED NIV | NORMALIZED EIV |
|---|---|---|---|---|---|---|
| ASSET 311 | BYPASS PROTECTION MECHANISM<br>READ APPLICATION DATA<br>GAIN PRIVILEGES OR ASSUME IDENTIFY<br>EXECUTE UNAUTHORIZED CODE/COMMANDS<br>OTHER | 3.6 | 0.0 | 2.0 | 0.9 | 0.0 |
| ASSET 311 | BYPASS PROTECTION MECHANISM<br>READ APPLICATION DATA<br>GAIN PRIVILEGES OR ASSUME IDENTIFY<br>EXECUTE UNAUTHORIZED CODE/COMMANDS | 2.7 | 0.0 | 2.0 | | |
| ASSET 312 | READ APPLICATION DATA<br>MODIFY APPLICATION DATA | 0.0 | 0.0 | 1.0 | 0.0 | 0.0 |
| ASSET 313 | BYPASS PROTECTION MECHANISM<br>READ APPLICATION DATA<br>MODIFY APPLICATION DATA | 4.0 | 0.0 | 3.9 | | |
| ASSET 313 | READ APPLICATION DATA | 0.0 | 0.0 | 0 | 0.84 | 0.0 |
| ASSET 313 | GAIN PRIVILEGES OR ASSUME IDENTIFY<br>EXECUTE UNAUTHORIZED CODE/COMMANDS<br>READ APPLICATION DATA<br>DOS | 2.0 | 0.0 | 0 | | |

TOPOLOGY 310

BUSINESS VALUE CONTEXT 330
E-VOTING

IMPACT DATA 440

EXPLOITABILITY DATA 430

NIST CVE DATASET

NL IMPACT DATA 620

EL IMPACT DATA 630

COMPUTATION 540

COMPUTATION 550

CONNECTED ASSET RISK MANAGEMENT

BACKGROUND

The present invention relates generally to management of connected assets. More particularly, the present invention relates to a method, system, and computer program for connected asset risk management.

Risk management is the process of identifying, analyzing, and mitigating various types of risks. Within the context of asset management, risk management involves applying the risk management process to an organization's assets. An asset, as referred to herein, is a network-accessible device, such as a physical machine that has an Internet Protocol (IP) address or host name, for example as a database server or application server. Connected assets are assets that together are involved in performing one or more business processes, with a relationship between assets (connectedness) that can be derived based on the data flow between the assets. Asset risk identification involves identifying and assessing threats to an organization's assets. Asset risk analysis involves determining a probability that a threat may occur and the potential outcome of such an event. Asset risk mitigation involves determining and carrying out options for reducing an asset's vulnerability to a potential threat.

A major aspect of risk management for businesses and other institutions is the question of how information system resources should be allocated for risk identification, analysis, and mitigation. Many types of businesses or other institutions face markedly different information system threats and potential harm, and risk managers of these institutions must be able to prioritize their information systems resources based on what they anticipate being the most serious and harmful threats to their operations.

As used herein, a vulnerability is a flaw in a software, firmware, hardware, or service component resulting from a weakness that can be exploited, causing a negative impact to the confidentiality, integrity, or availability of an impacted component or components. A weakness is condition in a software, firmware, hardware, or service component that, under certain circumstances, could contribute to the introduction of one or more vulnerabilities.

SUMMARY

The illustrative embodiments provide for connected asset risk management. An embodiment includes extracting, from vulnerability data describing a vulnerability applicable to a connected asset within a network of connected assets, a set of technical impacts of the vulnerability. The embodiment includes generating, using a business value context of the connected asset and the set of technical impacts of the vulnerability, a network layer impact score corresponding to the connected asset and the vulnerability. The embodiment includes generating, using the business value context of the connected asset and the set of technical impacts of the vulnerability, an enterprise layer impact score corresponding to the connected asset and the vulnerability. The embodiment includes generating, using the network layer impact score and the enterprise layer impact score, a remediation plan for the connected asset, the remediation plan comprising a planned adjustment of the connected asset to ameliorate the vulnerability. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3 depicts an example of connected asset risk management in accordance with an illustrative embodiment;

FIG. 4 depicts a continued example of connected asset risk management in accordance with an illustrative embodiment;

FIG. 5 depicts a continued example of connected asset risk management in accordance with an illustrative embodiment;

FIG. 6 depicts a continued example of connected asset risk management in accordance with an illustrative embodiment.

DETAILED DESCRIPTION

Figure 1:
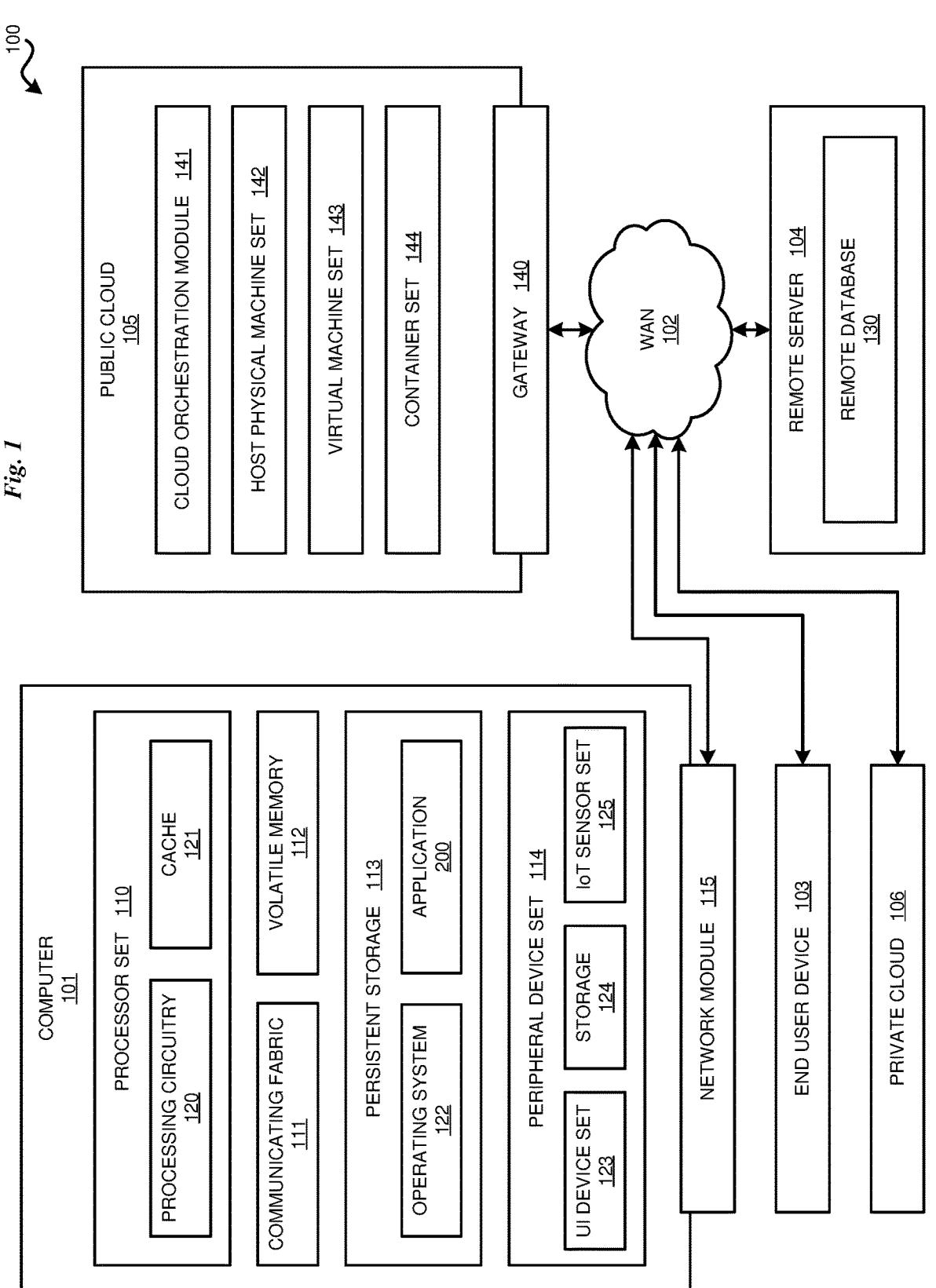
FIG. 1 depicts a block diagram of a computing environment in accordance with an illustrative embodiment.

The illustrative embodiments recognize that, because connected assets are connected to each other, a vulnerability in one of the assets, if exploited, could result in a failure or disruption to other assets or an entire network of which the exploited asset is a part. Therefore, existing risk assessment models that calculate a risk score for a connected asset, without considering an impact of that asset on other assets to which the first asset is connected, are insufficient in assessing a true risk of the asset. Thus, the illustrative embodiments recognize that there is an unmet need to perform connected asset risk management by assessing risks not simply to an asset, but to other assets within a network.

The present disclosure addresses the deficiencies described above by providing a process (as well as a system, method, machine-readable medium, etc.) that extracts, from vulnerability data describing a vulnerability applicable to a connected asset within a network of connected assets, a set of technical impacts of the vulnerability; generates, using a business value context of the connected asset and the set of technical impacts of the vulnerability, a network layer impact score and an enterprise layer impact score corresponding to the connected asset and the vulnerability; and generates, using the network layer impact score and the enterprise layer impact score, a remediation plan for the connected asset, the remediation plan comprising a planned adjustment of the connected asset to ameliorate the vulnerability. Thus, the illustrative embodiments provide for connected asset risk management.

An illustrative embodiment receives data of one or more connected assets in a network. Some non-limiting examples of data of a connected asset are a topology of assets in the network (i.e., a description of connections between assets), data flow data between assets, data specifying a configuration of one or more assets in the network, data specifying or usable in determining a business value context of an asset, and the like. If the data does not already include a topology of assets in the network, an embodiment uses a presently available technique to analyze the data and derive such a topology. For example, asset connectedness can be derived from data flow between assets using presently available tools such as Instana. (Instana is a registered trademark of Instana, an International Business Machines Corp., in the United States and other countries.) If the data of one or more connected assets in a network does not already include a specification of a business value context of an asset within the network, an embodiment uses a presently available technique to assign a business value context to the asset. A business value context of a connected asset describes a particular environment, the role that software plays within that environment, and an organization's priorities with respect to software security. For example, an organization that holds personally identifiable information only for its employees, for use in payroll, might have one set of threat exposures and priorities with respect to software security, while a bank or hospital system that maintains personally identifiable information, including private financial or health data for customers, might have a different set of threat exposures and priorities with respect to software security. If the data does not already include a specification of a business value context of an asset within the topology, an embodiment uses a presently available technique to assign a business value context to the asset.

An embodiment receives vulnerability data describing a vulnerability applicable to a connected asset within a network of connected assets. In one embodiment, the vulnerability data is stored in the National Institute of Standards and Technology's National Vulnerability Database (NVD), a United States government repository of standards based vulnerability management data represented using a standard protocol and accessible via an Application Program Interface (API). In the repository, each vulnerability is assigned a Common Vulnerabilities and Exposures (CVE) identifier. In the Common Weakness Risk Analysis Framework (CWRAF), Common Weakness Enumeration (CWE) is a formal list or dictionary of common software and hardware weaknesses (CWEs) that can occur in architecture, design, code, or implementation that can lead to exploitable security vulnerabilities. (CWRAF, CVE and CWE are registered trademarks of The MITRE Corporation in the United States and other countries.) In the repository, each vulnerability includes one or more CWEs related to that vulnerability, as well as an exploitability score of the vulnerability. In a CWE entry, the "common consequences" field lists technical impacts that can result from the weakness. While the CWE framework includes more than 800 CWEs, there are only eight different consequences or technical impacts of these weaknesses. In other words, if a weakness manifests itself in a product in an exploitable manner and an attacker successfully exploits the weakness, then there will be eight possible technical impacts or consequences from that weakness: modify data, read data, denial of service (DoS): unreliable execution, DoS: resource consumption, execute unauthorized code or commands, gain privileges/assume identity, bypass protection mechanism, and hide activities. In CWRAF, successful exploitation of a weakness could have varying impacts at four different layers: a system layer (the entity has access to, or control of, a system or physical host), application layer (the entity has access to an affected application), network layer (the entity has access to/from a network including an affected system or asset), and enterprise layer (the entity has access to a critical piece of enterprise infrastructure, such as a router, domain name system (DNS), and the like). CWRAF includes predefined business value contexts (referred to as vignettes), such as "online banking", an ecommerce category including "web-based retail provider", and several in an electronic voting, or e-voting, category. Each predefined vignette includes a Technical Impact Scorecard (TIS) listing technical impacts, the layer to which a technical impact applies, and an importance of the technical impact. The importance is a value between 0 and 10 that quantifies the impact of any weakness that can be exploited to have the given impact at the specified layer. Users can also prepare a TIS for their own business value context.

Another embodiment does not use CWRAF, and receives vulnerability and technical impact data from another source. Another embodiment uses another presently available technique, or a combination of a presently available technique and a human expert, to discover a vulnerability within a network, analyze the vulnerability, and assess possible impact(s) of the vulnerability.

An embodiment extracts, from vulnerability data describing a vulnerability applicable to a connected asset within a network of connected assets, a set of technical impacts of the vulnerability. In particular, one embodiment uses a vulnerability's CVE identifier to extract, from the NVD database, an exploitability score of the vulnerability and a CWE identifier corresponding to the CVE identifier. One embodiment uses the CWE identifier to extract, from the NVD database, a plurality of technical impacts of the weakness. Another embodiment uses another presently available technique to extract an exploitability score of the vulnerability and a plurality of technical impacts of the weakness from vulnerability data.

Using a business value context of the connected asset and the set of technical impacts of the vulnerability, an embodiment generates a network layer impact score corresponding to the connected asset and the vulnerability. In particular, an embodiment extracts a network layer importance value for each technical impact from the TIS corresponding to the business value context. An embodiment averages all the network layer importance values into an average network layer score (ANLS) of the vulnerability on the connected asset. An embodiment multiplies the ANLS by the exploitability score of the vulnerability, obtaining a network impact vulnerability (NIV) of the vulnerability on the asset. If there is more than one vulnerability affecting the connected asset, an embodiment obtains an NIV of each vulnerability on the asset, and averages the resulting NIVs together. An embodiment normalizes the NIV or average NIV into a value between zero and one. The resulting value is the network layer impact score of the connected asset, due to all the vulnerabilities affecting the connected asset. The network layer impact score expresses a probability of all the evaluated vulnerabilities affecting a network including the asset. For example, if the network layer impact score is 0.84, there is an 84% chance of all the evaluated vulnerabilities affecting a network including the asset.

Using a business value context of the connected asset and the set of technical impacts of the vulnerability, an embodiment generates an enterprise layer impact score corresponding to the connected asset and the vulnerability. In particular, an embodiment extracts an enterprise layer importance value for each technical impact from the TIS corresponding to the business value context. An embodiment averages all the enterprise layer importance values into an average enterprise layer score (AELS) of the vulnerability on the connected asset. An embodiment multiplies the AELS by the exploitability score of the vulnerability, obtaining an enterprise impact vulnerability (EIV) of the vulnerability on the asset. If there is more than one vulnerability affecting the connected asset, an embodiment obtains an EIV of each vulnerability on the asset, and averages the resulting EIVs together. An embodiment normalizes the EIV or average EIV into a value between zero and one. The resulting value is the enterprise layer impact score of the connected asset, due to all the vulnerabilities affecting the connected asset. The enterprise layer impact score expresses a probability of all the evaluated vulnerabilities affecting a critical piece of enterprise infrastructure of the infrastructure including the asset. For example, if the enterprise layer impact score is 0.84, there is an 84% chance of all the evaluated vulnerabilities affecting a critical piece of enterprise infrastructure of the infrastructure including the asset.

Using the network layer impact score and the enterprise layer impact score, an embodiment generates a remediation plan for the connected asset. The remediation plan includes a planned adjustment of the connected asset to ameliorate the vulnerability. Embodiments prioritize planned adjustments of connected assets according to the asset's network layer impact score, enterprise layer impact score, a combination of the network layer impact score and enterprise layer impact score, or a combination of the network layer impact score, enterprise layer impact score, and another vulnerability score obtained using another presently available technique. Thus, for example, the asset with the highest network layer impact score might be scheduled first for remediation, followed by the asset with the next highest network layer impact score, and so on.

An embodiment uses a presently available technique to adjust the connected asset according to the planned adjustment in the remediation plan. The adjustment ameliorates the vulnerability. Another embodiment provides the remediation plan to a human expert, who adjusts the connected asset according to the planned adjustment in the remediation plan.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as application 200 implementing connected asset risk assessment and management. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
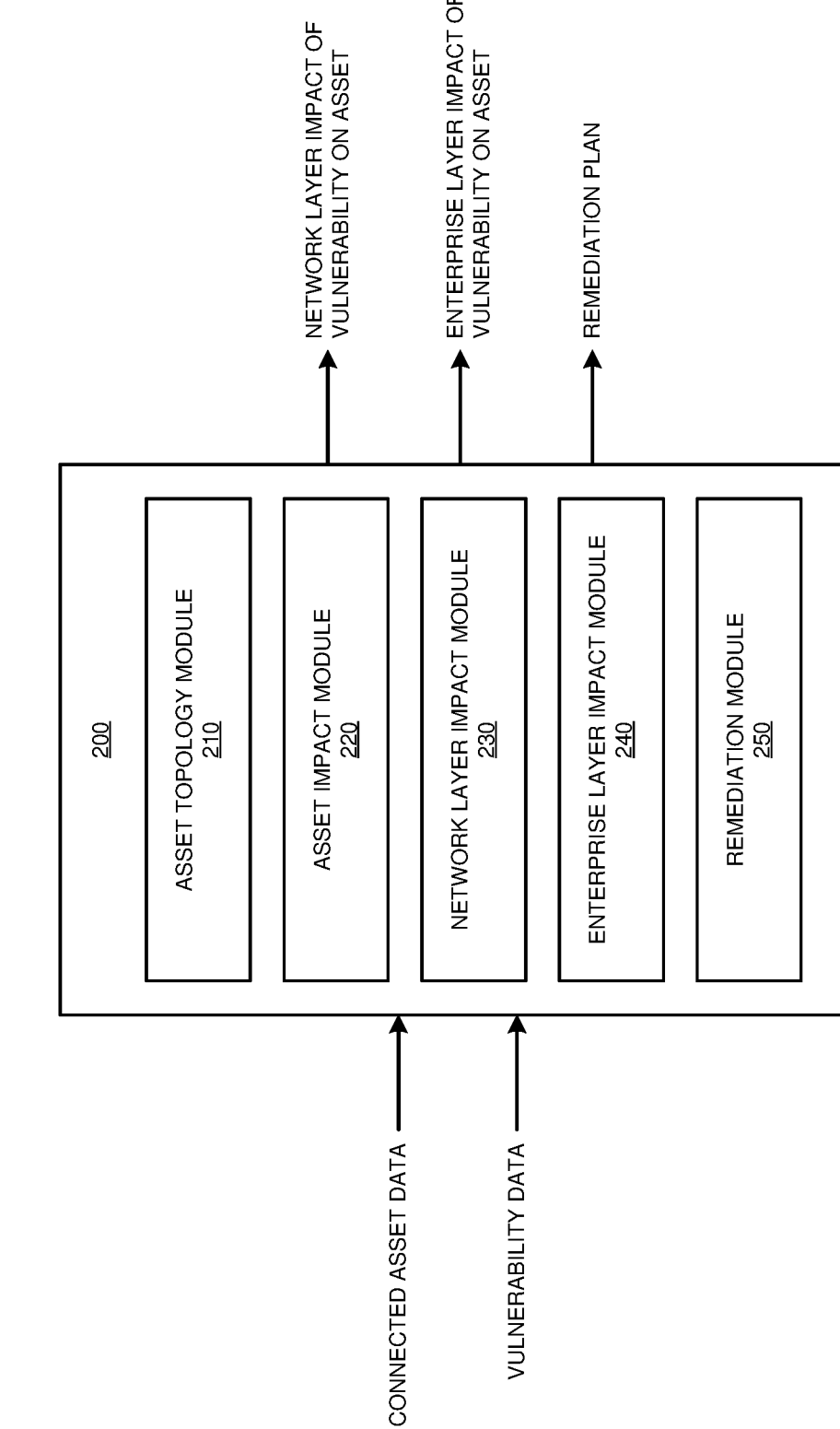
FIG. 2 depicts a block diagram of an example configuration for connected asset risk management in accordance with an illustrative embodiment.

With reference to FIG. 2, this figure depicts a block diagram of an example configuration for connected asset risk management in accordance with an illustrative embodiment. Application 200 is the same as application 200 in FIG. 1.

In the illustrated embodiment, application 200 receives data of one or more connected assets in a network. Some non-limiting examples of data of a connected asset are a topology of assets in the network (i.e., a description of connections between assets), data flow data between assets, data specifying a configuration of one or more assets in the network, data specifying or usable in determining a business value context of a connected asset, and the like. If the data does not already include a topology of assets in the network, asset topology module 210 uses a presently available technique to analyze the data and derive such a topology. For example, asset connectedness can be derived from data flow between assets using presently available tools such as Instana. If the data does not already include a specification of a business value context of an asset within the topology, module 210 uses a presently available technique to assign a business value context to the asset. A business value context of a connected asset describes a particular environment, the role that software plays within that environment, and an organization's priorities with respect to software security. For example, an organization that holds personally identifiable information only for its employees, for use in payroll, might have one set of threat exposures and priorities with respect to software security, while a bank or hospital system that maintains personally identifiable information, including private financial or health data for customers, might have a different set of threat exposures and priorities with respect to software security. If the data of one or more connected assets in a network does not already include a specification of a business value context of an asset within the network, module 210 uses a presently available technique to assign a business value context to the asset.

Asset impact module 220 receives vulnerability data describing a vulnerability applicable to a connected asset within a network of connected assets. In one implementation of module 220, the vulnerability data is stored in the NVD. In the NVD, each vulnerability is assigned a CVE identifier. In the NVD, each vulnerability includes one or more CWEs related to that vulnerability, as well as an exploitability score of the vulnerability. In a CWE entry, the "common consequences" field lists technical impacts that can result from that weakness. While the CWE framework includes more than 800 CWEs, there are only eight different consequences or technical impacts of these weaknesses. In other words, if a weakness manifests itself in a product in an exploitable manner and an attacker successfully exploits the weakness, then there will be eight possible technical impacts or consequences from that weakness: modify data, read data, denial of service (DoS): unreliable execution, DoS: resource consumption, execute unauthorized code or commands, gain privileges/assume identity, bypass protection mechanism, and hide activities. In CWRAF, successful exploitation of a weakness could have varying impacts at four different layers: a system layer (the entity has access to, or control of, a system or physical host), application layer (the entity has access to an affected application), network layer (the entity has access to/from a network including an affected system or asset), and enterprise layer (the entity has access to a critical piece of enterprise infrastructure, such as a router, domain name system (DNS), and the like). CWRAF includes predefined business value contexts (referred to as vignettes), such as "online banking", an ecommerce category including "web-based retail provider", and several in an electronic voting, or e-voting, category. Each predefined vignette includes a Technical Impact Scorecard (TIS) listing technical impacts, the layer to which a technical impact applies, and an importance of the technical impact. The importance is a value between 0 and 10 that quantifies the impact of any weakness that can be exploited to have the given impact at the specified layer. Users can also prepare a TIS for their own business value context.

Another implementation of module 220 does not use CWRAF, and receives vulnerability and technical impact data from another source. Another implementation of module 220 uses another presently available technique, or a combination of a presently available technique and a human expert, to discover a vulnerability within a network, analyze the vulnerability, and assess possible impact(s) of the vulnerability.

Module 220 extracts, from vulnerability data describing a vulnerability applicable to a connected asset within a network of connected assets, a set of technical impacts of the vulnerability. In particular, one implementation of module 220 uses a vulnerability's CVE identifier to extract, from the NVD database, an exploitability score of the vulnerability and a CWE identifier corresponding to the CVE identifier. One implementation of module 220 uses the CWE identifier to extract, from the NVD database, a plurality of technical impacts of the weakness. Another implementation of module 220 uses another presently available technique to extract an exploitability score of the vulnerability and a plurality of technical impacts of the weakness from vulnerability data.

Using a business value context of the connected asset and the set of technical impacts of the vulnerability, network layer impact module 230 generates a network layer impact score corresponding to the connected asset and the vulnerability. In particular, module 230 extracts a network layer importance value for each technical impact from the TIS corresponding to the business value context. Module 230 averages all the network layer importance values into an average network layer score (ANLS) of the vulnerability on the connected asset. Module 230 multiples the ANLS by the exploitability score of the vulnerability, obtaining a network impact vulnerability (NIV) of the vulnerability on the asset. If there is more than one vulnerability affecting the connected asset, module 230 obtains an NIV of each vulnerability on the asset, and averages the resulting NIVs together. Module 230 normalizes the NIV or average NIV into a value between zero and one. The resulting value is the network layer impact score of the connected asset, due to all the vulnerabilities affecting the connected asset. The network layer impact score expresses a probability of all the evaluated vulnerabilities affecting a network including the asset. For example, if the network layer impact score is 0.84, there is an 84% chance of all the evaluated vulnerabilities affecting a network including the asset.

Using a business value context of the connected asset and the set of technical impacts of the vulnerability, enterprise layer impact module 240 generates an enterprise layer impact score corresponding to the connected asset and the vulnerability. In particular, module 240 extracts an enterprise layer importance value for each technical impact from the TIS corresponding to the business value context. Module 240 averages all the enterprise layer importance values into an average enterprise layer score (AELS) of the vulnerability on the connected asset. Module 240 multiples the AELS by the exploitability score of the vulnerability, obtaining an enterprise impact vulnerability (EIV) of the vulnerability on the asset. If there is more than one vulnerability affecting the connected asset, module 240 obtains an EIV of each vulnerability on the asset, and averages the resulting EIVs together. Module 240 normalizes the EIV or average EIV into a value between zero and one. The resulting value is the enterprise layer impact score of the connected asset, due to all the vulnerabilities affecting the connected asset. The enterprise layer impact score expresses a probability of all the evaluated vulnerabilities affecting a critical piece of enterprise infrastructure of the infrastructure including the asset. For example, if the enterprise layer impact score is 0.84, there is an 84% chance of all the evaluated vulnerabilities affecting a critical piece of enterprise infrastructure of the infrastructure including the asset.

Using the network layer impact score and the enterprise layer impact score, remediation module 250 generates a remediation plan for the connected asset. The remediation plan includes a planned adjustment of the connected asset to ameliorate the vulnerability. Implementations of module 250 prioritize planned adjustments of connected assets according to the asset's network layer impact score, enterprise layer impact score, a combination of the network layer impact score and enterprise layer impact score, or a combination of the network layer impact score, enterprise layer impact score, and another vulnerability score obtained using another presently available technique. Thus, for example, the asset with the highest network layer impact score might be scheduled first for remediation, followed by the asset with the next highest network layer impact score, and so on.

Module 250 uses a presently available technique to adjust the connected asset according to the planned adjustment in the remediation plan. The adjustment ameliorates the vulnerability. Another implementation of module 250 provides the remediation plan to a human expert, who adjusts the connected asset according to the planned adjustment in the remediation plan.

With reference to FIG. 3, this figure depicts an example of connected asset risk management in accordance with an illustrative embodiment. Asset topology module 210 is the same as asset topology module 210 in FIG. 2. The example can be executed using application 200 in FIG. 2.

As depicted, asset topology module 210 analyzes connected asset data 300 and derives topology 310, including assets 311, 312, and 313. Module 210 also assigns business value context 320 and business value context 330 to all the assets in topology 310, for illustration purposes.

With reference to FIG. 4, this figure depicts a continued example of connected asset risk management in accordance with an illustrative embodiment. Topology 310 and assets 311, 312, and 313 are the same as topology 310 and assets 311, 312, and 313 in FIG. 3.

Vulnerability data 410, describing vulnerabilities applicable to assets 311, 312, and 313, is obtained from the NIST CVE dataset, also referred to as the NVD. Each vulnerability in vulnerability data 410 has a CVE identifier, weakness data 420 including one or more CWEs related to that vulnerability, and impact data 440 including technical impacts extracted from the NVD.

With reference to FIG. 5, this figure depicts a continued example of connected asset risk management in accordance with an illustrative embodiment. Topology 310, assets 311, 312, and 313, and business value context 320 are the same as topology 310, assets 311, 312, and 313, and business value context 320 in FIG. 3. Impact data 440 is the same as impact data 440 in FIG. 4.

Using business value context 320 of assets 311, 312, and 313 and impact data 440, network layer impact module 230 extracts, from the NIST CVE dataset, network layer (NL) impact data 520, a network layer importance value for each technical impact from the TIS corresponding to business value context 320, and enterprise layer impact module 240 extracts, from the NIST CVE dataset, enterprise layer (EL) impact data 530, an enterprise layer importance value for each technical impact from the TIS corresponding to business value context 320. All the network layer importance values are averaged together, and all the enterprise layer importance values are averaged together. Exploitability data 430 is also extracted from the NVD. Computation 540 multiplies the ANLS by the exploitability score of the vulnerability, obtaining a network impact vulnerability (NIV) of the vulnerability on the asset, averages NIVs for each vulnerability applicable to an asset together, and normalizes the average NIV into a value between zero and one to obtain a normalized NIV. Similarly, computation 550 multiplies the AELS by the exploitability score of the vulnerability, obtaining an enterprise impact vulnerability (EIV) of the vulnerability on the asset, averages EIVs for each vulnerability applicable to an asset together, and normalizes the average EIV into a value between zero and one to obtain a normalized EIV.

With reference to FIG. 6, this figure depicts a continued example of connected asset risk management in accordance with an illustrative embodiment. Topology 310, assets 311, 312, and 313, and business value context 330 are the same as topology 310, assets 311, 312, and 313, and business value context 330 in FIG. 3. Impact data 440 is the same as impact data 440 in FIG. 4. Computations 540 and 550 are the same as computations 540 and 550 in FIG. 5.

Using business value context 330 of assets 311, 312, and 313 and impact data 440, network layer impact module 230 extracts, from the NIST CVE dataset, NL impact data 620, a network layer importance value for each technical impact from the TIS corresponding to business value context 320, and enterprise layer impact module 240 extracts, from the NIST CVE dataset, EL impact data 630, an enterprise layer importance value for each technical impact from the TIS corresponding to business value context 330. Note that because business value context 330 has a different TIS from business value context 320 illustrated in FIG. 5, the importance values are different from those illustrated in FIG. 5. All the network layer importance values are averaged together, and all the enterprise layer importance values are averaged together. Exploitability data 430 is also extracted from the NVD. Computation 540 multiples the ANLS by the exploitability score of the vulnerability, obtaining a network impact vulnerability (NIV) of the vulnerability on the asset, aver-
ages NIVs for each vulnerability applicable to an asset
together, and normalizes the average NIV into a value
between zero and one to obtain a normalized NIV. Similarly,
computation 550 multiples the AELS by the exploitability
score of the vulnerability, obtaining an enterprise impact
vulnerability (EIV) of the vulnerability on the asset, aver-
ages EIVs for each vulnerability applicable to an asset
together, and normalizes the average EIV into a value
between zero and one to obtain a normalized EIV.

Figure 7:
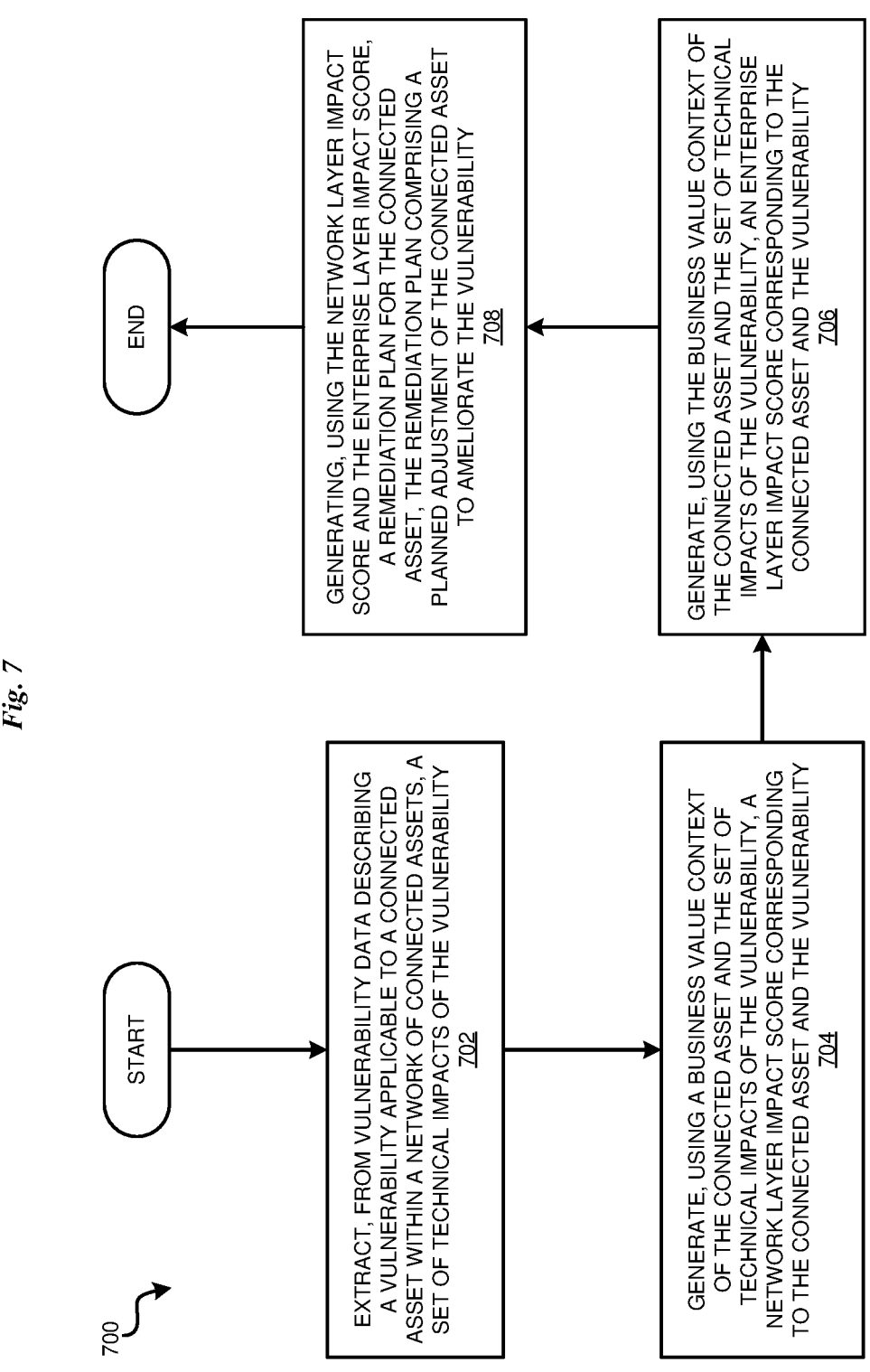
FIG. 7 depicts a flowchart of an example process for connected asset risk management in accordance with an illustrative embodiment.

With reference to FIG. 7, this figure depicts a flowchart of
an example process for connected asset risk management in
accordance with an illustrative embodiment. Process 700
can be implemented in application 200 in FIG. 2.

In the illustrated embodiment, at block 702, the process
extracts, from vulnerability data describing a vulnerability
applicable to a connected asset within a network of con-
nected assets, a set of technical impacts of the vulnerability.
At block 704, the process generates, using a business value
context of the connected asset and the set of technical
impacts of the vulnerability, a network layer impact score
corresponding to the connected asset and the vulnerability.
At block 706, the process generates, using the business value
context of the connected asset and the set of technical
impacts of the vulnerability, an enterprise layer impact score
corresponding to the connected asset and the vulnerability.
At block 708, the process generates, using the network layer
impact score and the enterprise layer impact score, a reme-
diation plan for the connected asset, the remediation plan
comprising a planned adjustment of the connected asset to
ameliorate the vulnerability. Then the process ends.

The following definitions and abbreviations are to be used
for the interpretation of the claims and the specification. As
used herein, the terms "comprises," "comprising,"
"includes," "including," "has," "having," "contains" or
"containing," or any other variation thereof, are intended to
cover a non-exclusive inclusion. For example, a composi-
tion, a mixture, process, method, article, or apparatus that
comprises a list of elements is not necessarily limited to only
those elements but can include other elements not expressly
listed or inherent to such composition, mixture, process,
method, article, or apparatus.

Additionally, the term "illustrative" is used herein to mean
"serving as an example, instance or illustration." Any
embodiment or design described herein as "illustrative" is
not necessarily to be construed as preferred or advantageous
over other embodiments or designs. The terms "at least one"
and "one or more" are understood to include any integer
number greater than or equal to one, i.e., one, two, three,
four, etc. The terms "a plurality" are understood to include
any integer number greater than or equal to two, i.e., two,
three, four, five, etc. The term "connection" can include an
indirect "connection" and a direct "connection."

References in the specification to "one embodiment," "an
embodiment," "an example embodiment," etc., indicate that
the embodiment described can include a particular feature,
structure, or characteristic, but every embodiment may or
may not include the particular feature, structure, or charac-
teristic. Moreover, such phrases are not necessarily referring
to the same embodiment. Further, when a particular feature,
structure, or characteristic is described in connection with an
embodiment, it is submitted that it is within the knowledge
of one skilled in the art to affect such feature, structure, or
characteristic in connection with other embodiments
whether or not explicitly described.

The terms "about," "substantially," "approximately," and
variations thereof, are intended to include the degree of error associated with measurement of the particular quantity
based upon the equipment available at the time of filing the
application. For example, "about" can include a range of
±8% or 5%, or 2% of a given value.

The descriptions of the various embodiments of the
present invention have been presented for purposes of
illustration but are not intended to be exhaustive or limited
to the embodiments disclosed. Many modifications and
variations will be apparent to those of ordinary skill in the
art without departing from the scope and spirit of the
described embodiments. The terminology used herein was
chosen to best explain the principles of the embodiments, the
practical application or technical improvement over tech-
nologies found in the marketplace, or to enable others of
ordinary skill in the art to understand the embodiments
described herein.

The descriptions of the various embodiments of the
present invention have been presented for purposes of
illustration but are not intended to be exhaustive or limited
to the embodiments disclosed. Many modifications and
variations will be apparent to those of ordinary skill in the
art without departing from the scope and spirit of the
described embodiments. The terminology used herein was
chosen to best explain the principles of the embodiments, the
practical application or technical improvement over tech-
nologies found in the marketplace, or to enable others of
ordinary skill in the art to understand the embodiments
described herein.

Thus, a computer implemented method, system or appa-
ratus, and computer program product are provided in the
illustrative embodiments for managing participation in
online communities and other related features, functions, or
operations. Where an embodiment or a portion thereof is
described with respect to a type of device, the computer
implemented method, system or apparatus, the computer
program product, or a portion thereof, are adapted or con-
figured for use with a suitable and comparable manifestation
of that type of device.

Where an embodiment is described as implemented in an
application, the delivery of the application in a Software as
a Service (SaaS) model is contemplated within the scope of
the illustrative embodiments. In a SaaS model, the capability
of the application implementing an embodiment is provided
to a user by executing the application in a cloud infrastruc-
ture. The user can access the application using a variety of
client devices through a thin client interface such as a web
browser (e.g., web-based e-mail), or other light-weight
client-applications. The user does not manage or control the
underlying cloud infrastructure including the network, serv-
ers, operating systems, or the storage of the cloud infra-
structure. In some cases, the user may not even manage or
control the capabilities of the SaaS application. In some
other cases, the SaaS implementation of the application may
permit a possible exception of limited user-specific appli-
cation configuration settings.

Embodiments of the present invention may also be deliv-
ered as part of a service engagement with a client corpora-
tion, nonprofit organization, government entity, internal
organizational structure, or the like. Aspects of these
embodiments may include configuring a computer system to
perform, and deploying software, hardware, and web ser-
vices that implement, some or all of the methods described
herein. Aspects of these embodiments may also include
analyzing the client's operations, creating recommendations
responsive to the analysis, building systems that implement
portions of the recommendations, integrating the systems
into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

extracting, from vulnerability data describing a vulnerability applicable to a connected asset within a network of connected assets, a set of technical impacts of the vulnerability;

extracting, from the vulnerability data, an exploitability score of the vulnerability;

generating, using a business value context of the connected asset and the set of technical impacts of the vulnerability, a network layer impact score corresponding to the connected asset and the vulnerability;

generating, using the business value context of the connected asset and the set of technical impacts of the vulnerability, an enterprise layer impact score corresponding to the connected asset and the vulnerability; and generating, using the network layer impact score and the enterprise layer impact score, a remediation plan for the connected asset, the remediation plan comprising a planned adjustment of the connected asset to ameliorate the vulnerability wherein generating the network layer impact score comprises:

extracting, from a technical impact scorecard corresponding to the business value context, a plurality of network layer importance values, each network layer importance value in the plurality of network layer importance values corresponding to a technical impact in the set of technical impacts of the vulnerability; and computing, by normalizing a result of multiplying the exploitability score of the vulnerability by an average of the plurality of network layer importance values, the network layer impact score.

2. The computer-implemented method of claim 1, wherein the vulnerability data is maintained in a vulnerability database accessible via an application programming interface.

3. The computer-implemented method of claim 1, wherein generating the enterprise layer impact score comprises:

extracting, from a technical impact scorecard corresponding to the business value context, a plurality of enterprise layer importance values, each enterprise layer importance value in the plurality of enterprise layer importance values corresponding to a technical impact in the set of technical impacts of the vulnerability; and computing, by normalizing a result of multiplying the exploitability score of the vulnerability by an average of the plurality of enterprise layer importance values, the enterprise layer impact score.

4. The computer-implemented method of claim 1, further comprising:

adjusting, according to the planned adjustment in the remediation plan, the connected asset, the adjusting ameliorating the vulnerability.

5. A computer program product comprising one or more computer readable storage media, and program instructions collectively stored on the one or more computer readable storage media, the program instructions executable by a processor to cause the processor to perform operations comprising:

extracting, from vulnerability data describing a vulnerability applicable to a connected asset within a network of connected assets, a set of technical impacts of the vulnerability;

extracting, from the vulnerability data, an exploitability score of the vulnerability;

generating, using a business value context of the connected asset and the set of technical impacts of the vulnerability, a network layer impact score corresponding to the connected asset and the vulnerability;

generating, using the business value context of the connected asset and the set of technical impacts of the vulnerability, an enterprise layer impact score corresponding to the connected asset and the vulnerability; and generating, using the network layer impact score and the enterprise layer impact score, a remediation plan for the connected asset, the remediation plan comprising a planned adjustment of the connected asset to ameliorate the vulnerability wherein generating the network layer impact score comprises:

extracting, from a technical impact scorecard corresponding to the business value context, a plurality of network layer importance values, each network layer importance value in the plurality of network layer importance values corresponding to a technical impact in the set of technical impacts of the vulnerability; and computing, by normalizing a result of multiplying the exploitability score of the vulnerability by an average of the plurality of network layer importance values, the network layer impact score.

6. The computer program product of claim 5, wherein the stored program instructions are stored in a computer readable storage device in a data processing system, and wherein the stored program instructions are transferred over a network from a remote data processing system.

7. The computer program product of claim 5, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

8. The computer program product of claim 5, wherein the vulnerability data is maintained in a vulnerability database accessible via an application programming interface.

9. The computer program product of claim 5, wherein generating the enterprise layer impact score comprises:

extracting, from a technical impact scorecard corresponding to the business value context, a plurality of enterprise layer importance values, each enterprise layer importance value in the plurality of enterprise layer importance values corresponding to a technical impact in the set of technical impacts of the vulnerability; and computing, by normalizing a result of multiplying the exploitability score of the vulnerability by an average of the plurality of enterprise layer importance values, the enterprise layer impact score.

10. The computer program product of claim 5, further comprising:

adjusting, according to the planned adjustment in the remediation plan, the connected asset, the adjusting ameliorating the vulnerability.

11. A computer system comprising a processor and one or more computer readable storage media, and program instructions collectively stored on the one or more computer readable storage media, the program instructions executable by the processor to cause the processor to perform operations comprising:

extracting, from vulnerability data describing a vulnerability applicable to a connected asset within a network of connected assets, a set of technical impacts of the vulnerability;

extracting, from the vulnerability data, an exploitability score of the vulnerability;

generating, using a business value context of the connected asset and the set of technical impacts of the vulnerability, a network layer impact score corresponding to the connected asset and the vulnerability;

generating, using the business value context of the connected asset and the set of technical impacts of the vulnerability, an enterprise layer impact score corresponding to the connected asset and the vulnerability; and generating, using the network layer impact score and the enterprise layer impact score, a remediation plan for the connected asset, the remediation plan comprising a planned adjustment of the connected asset to ameliorate the vulnerability wherein generating the network layer impact score comprises:

extracting, from a technical impact scorecard corresponding to the business value context, a plurality of network layer importance values, each network layer importance value in the plurality of network layer importance values corresponding to a technical impact in the set of technical impacts of the vulnerability; and computing, by normalizing a result of multiplying the exploitability score of the vulnerability by an average of the plurality of network layer importance values, the network layer impact score.

12. The computer system of claim 11, wherein the vulnerability data is maintained in a vulnerability database accessible via an application programming interface.

13. The computer system of claim 11, wherein generating the enterprise layer impact score comprises:

extracting, from a technical impact scorecard corresponding to the business value context, a plurality of enterprise layer importance values, each enterprise layer importance value in the plurality of enterprise layer importance values corresponding to a technical impact in the set of technical impacts of the vulnerability; and computing, by normalizing a result of multiplying the exploitability score of the vulnerability by an average of the plurality of enterprise layer importance values, the enterprise layer impact score.

14. The computer system of claim 11, further comprising:

adjusting, according to the planned adjustment in the remediation plan, the connected asset, the adjusting ameliorating the vulnerability.

*    *    *    *    *